TAPPED DELAY LINE INTEGRATOR

Filed May 26, 1965

Stanley A. Fierston
William C. Towle,
INVENTORS.

Harry M. Saragovitz
BY Edward J. Kelly
Herbert Berl
Jack W. Voigt
ATTORNEYS

United States Patent Office 3,428,905
Patented Feb. 18, 1969

3,428,905
TAPPED DELAY LINE INTEGRATOR

Stanley A. Fierston, Swampscott, and William C. Towle, Sudbury, Mass., assignors, by mesne assignments to the United States of America as represented by the Secretary of the Army Filed May 26, 1965, Ser. No. 459,127
U.S. Cl. 328—127 7 Claims
Int. Cl. G06g *7/18*

ABSTRACT OF THE DISCLOSURE

An integrator circuit having a tapped delay line type integrator and a feedback circuit connected in parallel. The feedback circuit is used for recirculating and storing the integrator input signal until a sample is taken off a tap of the tapped delay line integrator. The feedback circuit is connected from the output of the delay line back to an amlifier that is connected in common with both the input signal and the recirculated signal. A gate circuit is connected in the feedback circuit for controlling the sampling time of the integrated signal. A terminating impedance is connected to ground from a point in common with the feedback circuit at the output of the delay line. The impedance value of the feedback circuit is much lower than the terminating impedance so that the recirculating signal is not affected by the terminating impedance during recirculation. The input signal is recirculated through the feedback circuit a predetermined number of times depending on the amount of storage time desired for integration of the input signal.

The invention described herein relates generally to an integrator circuit and more particularly, this invention relates to a tapped delay line integrator.

In a video pulse converter for a radar system which converts very narrow monopulse error signals to digital form, a part of this process requires analog integration and temporary storage of the area of the input video signals. If an operational amplifier with a capacitor in the feedback path were used to perform this integration, relatively large bandwidth amplifiers and small integrating capacitors would be necessary due to the extremely narrow video pulses used. The fact that successive signals need to be processed with relatively close spacing in time required the use of a quench circuit to discharge the integrating capacitor after a sample was taken of the integrated value. Although relays or diodes may be used to physically short-circuit the capacitor, the fast repetition rate of pulses being integrated will not allow time for a relay to operate, and the inherent resistance in a diode will not allow the capacitor to be completely quenched thus leaving an error voltage on the capacitor.

Therefore, there was a need for an integrator circuit which would accept pulses without limitation to their repetition and integrate the pulse with a minimum of error.

In view of these facts, an object of the present invention is to provide a delay line integrator circuit which does not require a quenching circuit in order to integrate pulses applied at a fast repetitive rate.

Another object of this invention is to provide an integrator circuit which will store the integrated signal portion of the input signal.

Further, an object of this invention is to provide an integrator which will integrate a signal with less error than previous integrators.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a device according to the present invention, and in which:

Figure 1:
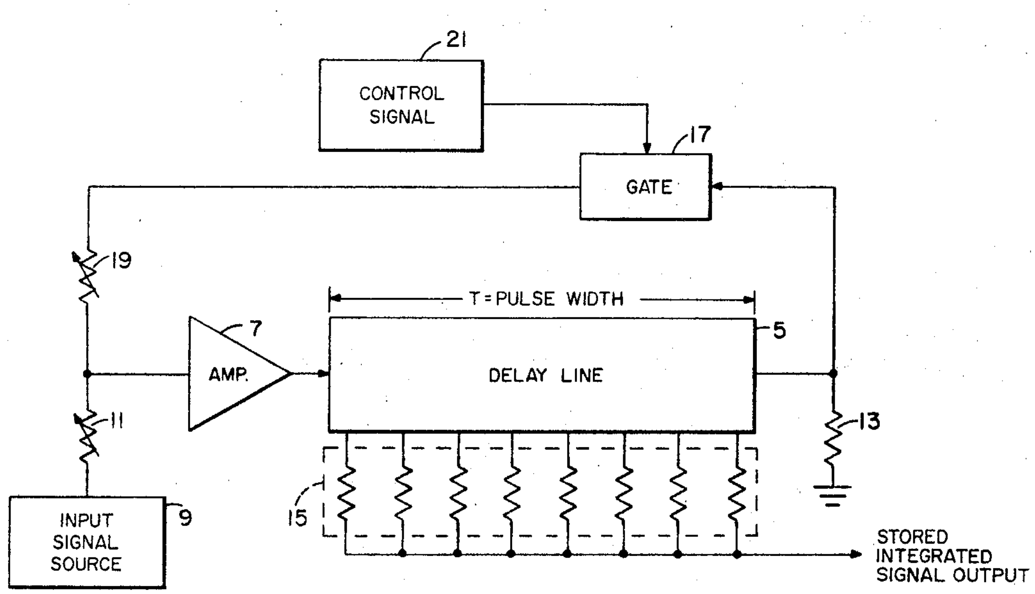
FIGURE 1 shows a schematic diagram of one embodiment of the invention.

The invention may be better understood with reference to the drawings in which FIGURE 1 shows a delay line 5 with an amplifier 7 connected to its input. A signal input means 9 is connected to amplifier 7 by means of resistor 11. A terminating impedance 13 is connected between the output of delay line 5 and ground potential. In order to extract the integrated signal portion of the signal from delay line 5, a plurality of resistors 15 are connected along the delay line 5 at predetermined intervals therealong and the opposite ends of the resistors 15 are connected together forming a voltage summing circuit giving the integrated output. Further, the signal is stored by recirculating the signal out of delay line 5 through the path of gate 17 and resistor 19. This path is of a substantially lower impedance than that of impedance 13. A control signal 21 is applied to gate 17 when sufficient storage time has elapsed to clear the circuit of a signal by allowing it to be dissipated in impedance 13. Recirculating signal losses are restored by amplifier 7.

Figure 2:
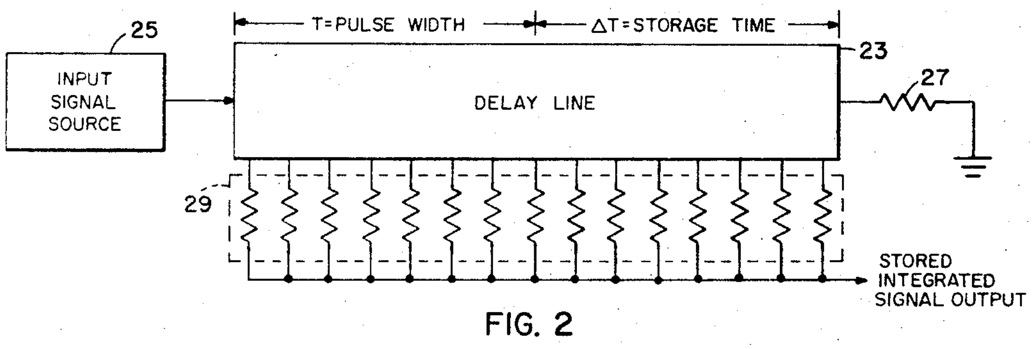
FIGURE 2 shows a schematic diagram of a second embodiment of the invention.

Referring now to FIGURE 2, a preferred embodiment of the invention is shown wherein delay line 23 is longer than delay line 5 in FIGURE 1 by the amount of storage time required. An impedance 27 is connected between the output of delay line 23 and ground potential, and an input signal 25 is connected to the input of the delay line. A plurality of resistors 29 are connected to the delay line 23 for extracting the integrated signal portion of the signal as discussed above for resistors 15.

The operation of the invention occurs in the following manner. First, as shown in FIGURE 1, the gate 17 is normally left open until the arrival of a signal to be processed from signal input source 9. The signal will then enter the delay line 5, which has a delay time of one pulse width, through resistor 11 and amplifier 7, with the integrated output gradually approaching its final value as the signal completely fills the line. With the gate 17 then closed by control signal 21, the signal will continue to both circulate by means of a feedback path through gate 17, resistor 19 and amplifier 7 and produce its integrated output at the output of resistors 15 connected to taps along delay line 5 in a predetermined manner as described above. After integration, the circuit is cleared of the signal by opening gate 17 and allowing the signal to dissipate in impedance 13.

The accuracy with which the delay line will integrate is dependent on the number of taps taken therealong. Once it is determined how many taps N are necessary, the taps will be placed along the delay line in intervals of $\Delta$ where $\Delta = L/N$, L being the length of the delay line and the first tap being $\Delta/2$ from the input of the delay line. This configuration has been proven to produce the integral of a signal applied to the delay line with the least amount of error.

Second, the operation of the second embodiment of the invention is as follows. A delay line 23, having a delay time of one pulse width T plus the delay $\Delta T$ which is the desired storage time, accepts a signal to be integrated from signal source 25. The pulse signal moves down the delay line 23 and when the leading edge of the pulse reaches the end of the delay line, the integrated output is extracted from resistors 29. Instead of recirculating the signal, the delay line automatically stores the signal and discharges the line through resistor 27.

appended claims.

What is claimed is:

1. A delay line integrator circuit comprising a signal delay means for delaying an input signal which is to be integrated; tapping means connected to said signal delay means where an integrated signal portion of said input signal is taken as the output of said integrator circuit; means connected to said signal delay means whereby said input signal will be stored until a sample is taken of said integrated signal portion of said input signal; and a terminating impedance connected to an output of said signal delay means clearing said integrator circuit of a signal after said sample of the integrated signal portion of said input signal is taken.

2. The device as set forth in claim 1 wherein said signal delay means is a delay line.

3. A device as set forth in claim 2 wherein said tapping means is a plurality of impedances connected along said delay line in a predetermined spacing having their outputs paralleled for summing their outputs to give the integral of said input signal.

4. A device as set forth in claim 3 wherein storage is provided by a recirculating path for said input signal through a gate circuit connected in parallel with said delay line; said input signal being recirculated a predetertegrating circuit.

6. A device as set forth in claim 1 wherein signal delay means has a delay time equal to the pulse width of said input signal.

7. A device as set forth in claim 3 wherein said storage means comprises an additional length of delay line added in series with the original delay line, said additional length of delay line having a time delay constant equal to the desired storage time required; and said additional length of delay line having taps at predetermined intervals therealong connected in parallel with said tapping means first mentioned, wherefrom the integrated signal is taken.

References Cited

UNITED STATES PATENTS

| | | | |
|---|---|---|---|
| 3,068,417 | 12/1962 | Fiske | 328—127 |
| 3,209,157 | 9/1965 | Bruck et al. | 307—265 |

ARTHUR GAUSS, *Primary Examiner.*

R. H. PLOTKIN, *Assistant Examiner.*

U.S. Cl. X.R.

328—55, 56; 307—227, 228, 265, 268